Patented Mar. 20, 1951

2,545,559

UNITED STATES PATENT OFFICE 2,545,559

ACETONE RESIN MODIFIED PHENOL RESINS

Conrad F. Schrimpe, Woodbridge, N. J., assignor, by mesne assignments, to Union Carbide and Carbon Corporation, a corporation of New York No Drawing. Application July 25, 1947, Serial No. 763,739

7 Claims. (Cl. 260—43)

This invention relates to heat-reactive resinous compositions primarily intended for application in solution-form for bonding, such as impregnating or coating glass bats, and then heat-setting. Resins extensively used for this purpose are the phenol-formaldehyde resins prepared under basic conditions. As usually made they are water-insoluble in the intermediate stage, and this necessitates the use of alcohols and other organic solvents, which are lost in their application through evaporation, and accordingly add measurably to the cost as well as entailing other objections, such as creeping or carrying of the resin to the surface during evaporation; moreover, such organic solvents are inflammable and not permissible in some establishments. Water-soluble phenol resins, therefore, have been developed, generally by under-reacting to avoid layer-separation of resin and water, neutralizing to a pH of 7–8, and then removing a greater part of the water by high-vacuum distillation at low temperature; a high formaldehyde ratio (two moles or more to one of phenol) also contributes to water-solubility. Such resins necessarily have a large percentage of unreacted and low order condensation products that tend to persist therein to volatilize upon heat-hardening in the bonding operation, they have limited water-dilutibility, and the products have poor keeping qualities and lack caustic resistance.

On the other hand, heat-reactive resins can be obtained from the condensation of acetone and formaldehyde under basic conditions, and these resins are water-soluble when the reaction pH is less than 9.5 to 10 irrespective of proportions of reactants; according to Flemming U. S. 1,955,060, April 17, 1934, the products are then largely methylol acetones. These condensation resins differ markedly from the water-soluble phenol-formaldehyde resins in being infinitely water-dilutible and having a relatively high caustic resistance and better keeping qualities. But at the low pH the reaction soon reaches an equilibrium with substantial amounts of unreacted ingredients and low order condensation products; and, while the free acetone is readily recovered, the unreacted formaldehyde tends to remain in solution or as loosely-held methylols (in excess of one methylol substituent on each acetone methyl group) to boil off, together with the low order condensation products, in the hardening operation and thus become lost or wasted.

Surprisingly it has now been found that water-soluble acetone resins can be incorporated with water-soluble phenol-formaldehyde resins to impart marked improvements over each resin individually; while the water-miscibility drops as compared to the resins individually, there is an absence of precipitation or setting when mixed with water emulsions of oil or "Vinsol" (a hard pine resin extracted from wood rosin) in accordance with the common practice followed in glass-wool bonding. The mixture has improved stability on standing, and the hardening proceeds smoothly due to the plasticizing and leveling effect of the acetone resin. What is most unusual is that the solids content of the mixture upon hardening is significantly higher than the average of the two resins taken separately, which demonstrates that an inter-reaction or co-condensation takes place accompanied by a conversion of undesirable unreacted and low order products into useful bonding resin; this not only reduces the waste but aids very materially both in lowering the cost and enhancing the usefulness of the product. The hardened end product retains the high caustic resistance of the acetone resin, apparently due to the protective action of that resin, and on the other hand is free from swelling upon exposure to high humidity when adequately baked. Since the acetone resin can be and preferably is catalyzed by organic bases, the problem of ash is minimized, particularly when the water-soluble phenol resin is prepared at a pH approximating the neutral point.

The following is given as an illustration of the invention:

A.—A water-soluble heat-hardening phenol-formaldehyde resin was prepared (in accordance with the disclosure of Meharg, 2,190,672, February 20, 1940) by mixing 100 pounds by weight of phenol with 170 pounds of aqueous formaldehyde (37%). About 2 pounds of caustic soda dissolved in water was slowly drawn into the mass by means of a vacuum (26 inches), and the mass was refluxed (66°–68° C.) for 3.5–4 hours. It was cooled to about 50° C., the caustic was neutralized to a pH of 7.6–7.8 by drawing in phosphoric acid in water solution, and vacuum-dehydration at 50° C. was applied to remove 83 pounds of water and low boiling volatile to yield a solution having about 68.3 per cent solids (determined by heating 2 grams mixed with 10 cc. of methanol at 150° C. for 2 hours in a constant temperature oven and calculating by dividing the final weight by the original weight multiplied by 100).

B.—An acetone resin was made by charging a reaction kettle with 100 pounds (1.73 moles) of acetone, 138.50 pounds (1.73 moles) of aqueous formaldehyde (37%), 2.15 pounds of dimethylamine (25% water solution) and 12.6 pounds of a low molecular order condensation product distilled from a previous run; the charge had a pH of about 8.8. Upon heating to 55° C. a reaction set in and the temperature was allowed to rise to 66° C. with refluxing at this temperature for 4.5 hours. The apparatus was set for atmospheric dehydration, and 144 pounds of distillate was collected and dehydrated to yield substantially pure acetone for use as part of the charge in a succeeding run. A further fraction of 12.6 pounds was then distilled, which was the low molecular order condensation product to be used as part of the charge in a succeeding run. In the distillation the volatile catalyst disappears to give a pH of 6–7 in the final product. The yield was 95 pounds of a pure amber colored acetone resin, with a solids content of 51.6 per cent by the foregoing test and a water miscibility of 2500 per cent and greater.

Various combinations of the two resins A and B always gave upon hardening a higher solids content than the calculated average. As an instance equal parts by weight of each of the liquid resins were mixed; the calculated average solids content was 59.9 per cent, but the solids content of the mixture as determined by test was 64.0 per cent or an increase of almost 7 per cent over the calculated average. A very material part of the otherwise non-useful content of the resins was therefore converted into useful resin by co-condensation through the inter-reaction of the acetone and phenol resins.

A further characteristic of the combination is that it is readily heat-reactive without added hardening catalyst; evidently the phenol resin in the combination provides hardening activity. The hardening, however, can be accelerated by the addition of hardening catalysts including both inorganic and organic bases.

The invention is not restricted to the resins selected for illustration, for it does not reside therein. Water-soluble phenolic resins also result from under-reaction of alkyl- and aryl-substituted monohydric phenols and formaldehyde (including its polymers). Water-soluble acetone resins generally form with both inorganic and organic base catalysts, when the pH for the most part is below 9.5–10.5, and with any proportion of formaldehyde ranging from one to six moles for each mole of acetone; increasing the molar ratio of formaldehyde to about two and more moles insures a corresponding completeness of the acetone reacted in, though it also increases the free formaldehyde and loosely-bonded methylols in the solution; and, moreover, the inclusion of a phenol as a third ingredient of the acetone resin is permissible to react with formaldehyde and methylol groups. The most effective proportion of the two resins appears to be equal parts of each, but 25–75 per cent of either in the composition shows a marked improvement in the hardened combined product.

The combined product has superior keeping qualities, and it has been found particularly useful in the bonding of glass bats on account of its high dilutibility with water emulsions of oil, etc., without settling. For this application, for example, equal parts by weight of the liquid resins are added to a somewhat greater amount of an emulsion of oil or "Vinsol" or mixture of both, and the whole diluted with about five times its weight of water. This is sprayed on a mat of glass wool spread on perforated plates (one-half on each side) and the mat is baked for 2 hours at 200° C. The bat so formed has a density of about 2 pounds per cubic foot and a binder content of 2–3 per cent.

Moreover, though the invention finds its immediate utility in the water-soluble resin field and is so set out in the foregoing, it is not necessarily so restricted. It also has application to spirit-soluble, heat-hardening base-catalyzed intermediates, particularly to laminating varnishes. To illustrate, a spirit-soluble phenol-formaldehyde resin results when a mole or more of formaldehyde is reacted with each mole of the phenol under basic conditions to the point where a water-insoluble liquid resin separates; the resin at this stage is soluble in alcohol or acetone. Likewise a spirit-soluble but water-insoluble liquid acetone resin results when from one to two moles of formaldehyde are reacted with each mole of acetone at a pH maintained at 9.5–10.5 and higher. When the dehydrated resins in alcohol solutions are mixed (in the same proportions as the water-soluble resins), and applied, for instance, to paper or other sheet material, the solvent evaporated, and a stack of superposed treated sheets subjected to normally-used heat and pressure in a press, there is obtained a well-bonded hardened structure characterized by improved caustic resistance and absence of swelling from moisture absorption similar to the water-soluble resin-bonded articles.

What is claimed is:

1. Resinous composition comprising a water and spirit soluble heat-hardening base-catalyzed condensation product of a phenol, selected from the group consisting of phenol and alkyl and aryl substituted monohydric phenols, with formaldehyde, and from 25 to 75 per cent by weight of the composition of a soluble base-catalyzed dehydrated condensation product of acetone and formaldehyde, said composition being characterized by inter-reaction of the products upon heating under basic conditions to an insoluble state with a solids content in excess of the average of the condensation products.

2. Resinous composition comprising a water-soluble heat-hardening base-catalyzed condensation product of a phenol, selected from the group consisting of phenol and alkyl and aryl substituted monohydric phenols, with formaldehyde, and from 25 to 75 per cent by weight of the composition of a water-soluble base-catalyzed dehydrated condensation product of acetone and formaldehyde, said composition being characterized by dilutibility without settling and inter-reaction of the products upon heating under basic conditions to an insoluble state with a solids content in excess of the average of the condensation products.

3. Resinous product comprising the inter-reaction product under basic conditions of a water and spirit soluble heat-hardening base-catalyzed condensation product of an phenol, selected from the group consisting of phenol and alkyl and aryl substituted monohydric phenols, with formaldehyde, and from 25 to 75 per cent by weight of the composition of a soluble base-catalyzed dehydrated condensation product of acetone and formaldehyde, said resinous product being characterized by an insoluble state, and a solids content in excess of the average of the condensation products.

4. Process which comprises mixing a water and spirit soluble heat-hardening phenol-formaldehyde condensation product with a soluble base-catalyzed dehydrated acetone-formaldehyde condensation product, the latter forming from 25 to 75 per cent of the mixture, and inter-reacting the condensation products by heating under basic conditions to an insoluble state.

5. Process which comprises condensing a reaction mixture of acetone and formaldehyde in the presence of an alkaline catalyst at a reaction pH less than 10 to form a water-soluble condensate, dehydrating said condensate, and then mixing the dehydrated condensate with a base-catalyzed, water-soluble, heat-hardening condensation product of phenol and formaldehyde, the latter product forming from 25 to 75 per cent of the mixture, and inter-reacting the condensation products by heating under basic conditions to an insoluble state.

6. Process which comprises condensing acetone and formaldehyde in about equimolar proportions at a reaction pH of less than 10 and in the presence of an alkaline catalyst to form a water-soluble condensate, dehydrating said condensate and then mixing the dehydrated condensate with a partially dehydrated base catalyzed, water-soluble, heat-hardening condensation product of phenol and formaldehyde, the latter product forming from 25 to 75 per cent of the mixture, and inter-reacting the condensation products by heating under basic conditions to an insoluble state.

7. A heat-hardenable resinous composition comprising a heat-hardenable, water-soluble, base catalyzed condensation product of phenol and formaldehyde and from 25 to 75 per cent by weight of the composition of a dehydrated, water-soluble, base-catalyzed resinous condensation product of one mol acetone and between one and six mols of formaldehyde, said composition being characterized by inter-reaction of the products upon heating under basic conditions to an insoluble state with a solids content in excess of the average of the condensation products.

CONRAD F. SCHRIMPE.

REFERENCES CITED

The following references are of record in the file of this patent:

UNITED STATES PATENTS

| Number | Name | Date |
| --- | --- | --- |
| 2,206,906 | Loos | July 9, 1940 |